United States Patent
Baker et al.

(10) Patent No.: US 8,543,531 B2
(45) Date of Patent: Sep. 24, 2013

(54) COHERENCY OF RELATED OBJECTS

(75) Inventors: Nathan A. Baker, Raleigh, NC (US);
James D. Creasman, Apex, NC (US);
Barry J. Pellas, Durham, NC (US);
Adrian P. Vrouwenvelder, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1038 days.

(21) Appl. No.: 12/509,966

(22) Filed: Jul. 27, 2009

(65) Prior Publication Data
US 2011/0022565 A1     Jan. 27, 2011

(51) Int. Cl.
*G06N 7/04*     (2006.01)

(52) U.S. Cl.
USPC .......................... 706/54; 340/572.1; 340/10.1

(58) Field of Classification Search
USPC ................................. 706/54; 340/572.1, 10.1
See application file for complete search history.

(56) References Cited

U.S. PATENT DOCUMENTS

| | | | | |
|---|---|---|---|---|
| 6,882,897 | B1* | 4/2005 | Fernandez | 700/132 |
| 2006/0079247 | A1* | 4/2006 | Ritter | 455/456.1 |
| 2006/0184993 | A1* | 8/2006 | Goldthwaite et al. | 725/135 |
| 2007/0111178 | A1 | 5/2007 | Riley | |
| 2007/0235529 | A1 | 10/2007 | Peters | |
| 2007/0260599 | A1* | 11/2007 | McGuire et al. | 707/5 |
| 2008/0249865 | A1* | 10/2008 | Angell et al. | 705/14 |
| 2009/0058615 | A1* | 3/2009 | Schultz | 340/10.4 |
| 2010/0030578 | A1* | 2/2010 | Siddique et al. | 705/3 |
| 2010/0161600 | A1* | 6/2010 | Higgins et al. | 707/736 |

OTHER PUBLICATIONS

Anonymous, "Garanimals", http://en.wikipedia.org/wiki/garanimals, Nov. 7, 2008.
Anonymous, "Our Packages," pp. 1-2, copyright 2008, InStyleMale.com. Webpage available at: http://web.archive.org/web/20090312063139/http://www.instylemale.com/packages.html.

* cited by examiner

*Primary Examiner* — Kakali Chaki
*Assistant Examiner* — Mai T Tran
(74) *Attorney, Agent, or Firm* — Law Office of Jim Boice

(57) ABSTRACT

A service, which in one embodiment is a fashion social network, applies pre-defined criteria to items proposed for selection by a user, in order to determine if the proposed items are compatible with descriptive attributes and/or current possessions of the user.

16 Claims, 4 Drawing Sheets

COHERENCY OF RELATED OBJECTS

BACKGROUND

The present disclosure relates to the field of computers, and specifically to networked computers. Still more particularly, the present disclosure relates to the sharing of information on a network.

BRIEF SUMMARY

A service, which in one embodiment is a fashion social network, applies pre-defined criteria to items proposed for selection by a user, in order to determine if the proposed items are compatible with current possessions and/or other attributes of the user.

DETAILED DESCRIPTION

Figure 1:
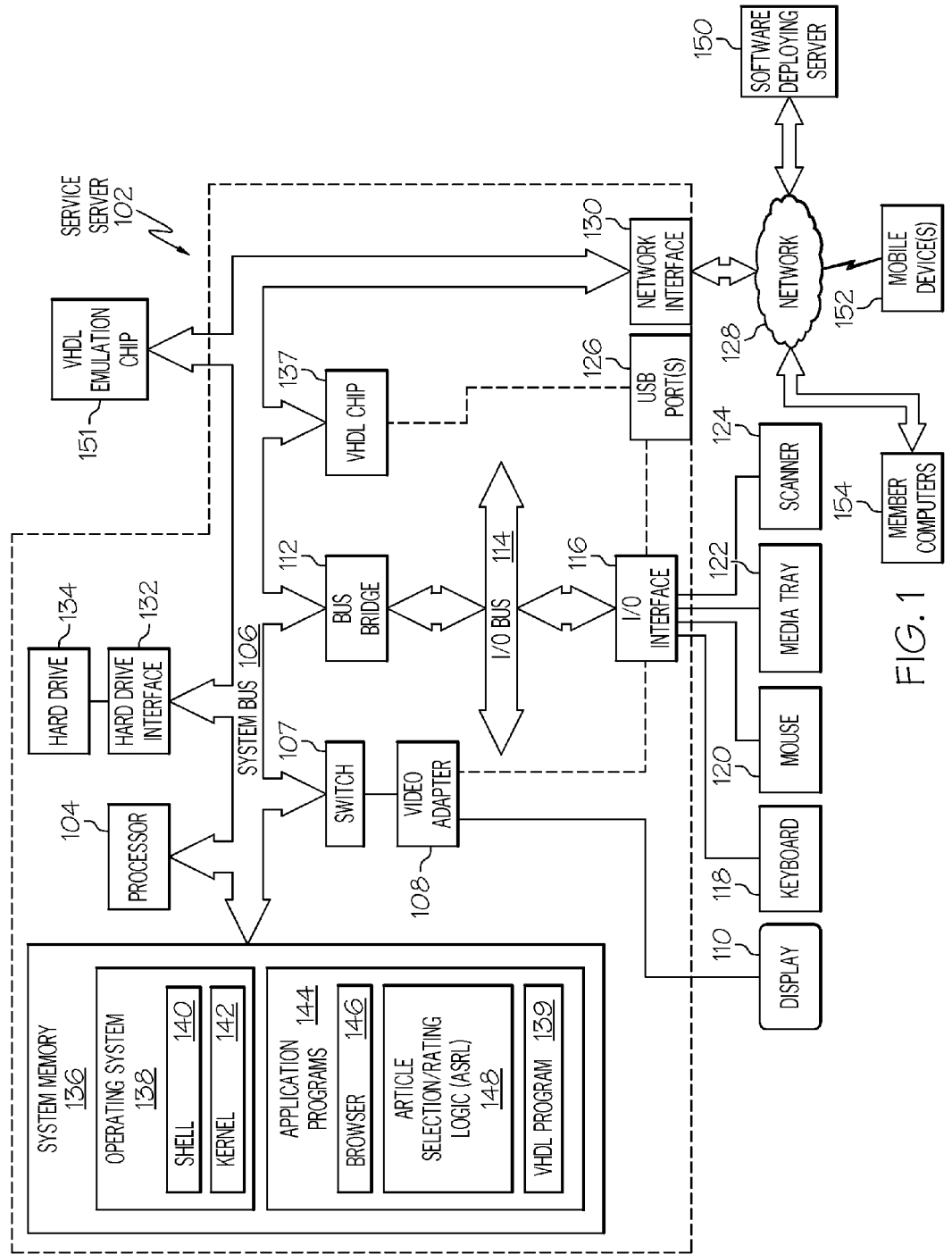
FIG. 1 depicts an exemplary hardware device in which the present invention may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-readable medium may be, for example but not limited to, an electronic, magnetic, optical, electromagnetic, infrared, or semiconductor system, apparatus or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, or computer-readable medium may be any medium that can store the program for use by or in connection with the instruction execution system, apparatus, or device.

Computer program code for carrying out operations of the present invention may be written in any combination of one or more programming languages, including an object oriented programming language such as Java (JAVA is a registered trademark of Sun Microsystems, Inc. in the United States and other countries), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary service server 102, which depicts one example of an appropriately configured hardware device that may be utilized by the present invention. Note that some or all of the exemplary architecture, including both depicted hardware and software, shown for and within service server 102 may be utilized by software deploying server 150, mobile devices 152, and/or member computers 154.

Service server 102 includes a processor unit 104 that is coupled to a system bus 106. Processor unit 104 may utilize one or more processors, each of which has one or more processor cores. A video adapter 108 drives/supports a display 110, which is an output display that is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., article selection/rating logic—ASRL 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and (if a VHDL chip 137 is not utilized in a manner described below) external USB port(s) 126. While the format of the ports connected to I/O interface 116 may be any known to those skilled in the art of computer architecture, in a preferred embodiment some or all of these ports are universal serial bus (USB) ports.

Note that mobile device(s) 152 may be a computer such as a laptop, desktop, etc., or alternatively, mobile device(s) 152 may be a "smart" phone, a personal digital assistant (PDA), or any other device that is capable of storing, displaying, and transmitting content using one or more of the processes/protocols described herein. When the architecture of service server 102 is utilized by a mobile device 152, that mobile device 152 includes a scanner 124, which may be a radio frequency identifier (RFID) chip detector, a bar code reader, or other hardware capable of reading information about an item in a manner described below. This information is then stored by ASRL 148 in system memory 136 and/or hard drive 134.

As depicted, service server 102 is able to communicate with a software deploying server 150, mobile devices 152, and/or member computers 154 via network 128 using a network interface 130. Network 128 may be an external network, wired or wireless, such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in service server 102. This volatile memory includes additional higher levels of volatile memory (not shown), including, but not limited to, cache memory, registers and buffers. Data that populates system memory 136 includes service server 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., service server 102) to send and receive network messages to the Internet using hypertext transfer protocol (HTTP) messaging, thus enabling communication with software deploying server 150 and other described computer systems.

Application programs 144 in service server 102's system memory (as well as software deploying server 150's system memory) also include an article selection/rating logic (ASRL) 148. ASRL 148 includes code for implementing the processes described below, including those described in FIGS. 2-4. In one embodiment, service server 102 is able to download ASRL 148 from software deploying server 150, including in an on-demand basis. Note further that, in one embodiment of the present invention, software deploying server 150 performs all of the functions associated with the present invention (including execution of ASRL 148), thus freeing service server 102 from having to use its own internal computing resources to execute ASRL 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from ASRL 148 causes VHDL program 139 to configure VHDL chip 137, which may be an FPGA, ASIC, etc.

In another embodiment of the present invention, execution of instructions from ASRL 148 results in a utilization of VHDL program 139 to program a VHDL emulation chip 151. VHDL emulation chip 151 may incorporate a similar architecture as described above for VHDL chip 137. Once ASRL 148 and VHDL program 139 program VHDL emulation chip 151, VHDL emulation chip 151 performs, as hardware, some or all functions described by one or more executions of some or all of the instructions found in ASRL 148. That is, the VHDL emulation chip 151 is a hardware emulation of some or all of the software instructions found in ASRL 148. In one embodiment, VHDL emulation chip 151 is a programmable read only memory (PROM) that, once burned in accordance with instructions from ASRL 148 and VHDL program 139, is permanently transformed into a new circuitry that performs the functions needed to perform the process described below in FIGS. 2-4.

The hardware elements depicted in service server 102 are not intended to be exhaustive, but rather are representative to highlight essential components required by the present invention. For instance, service server 102 may include alternate memory storage devices such as magnetic cassettes, digital versatile disks (DVDs), Bernoulli cartridges, and the like. These and other variations are intended to be within the spirit and scope of the present invention.

Figure 2:
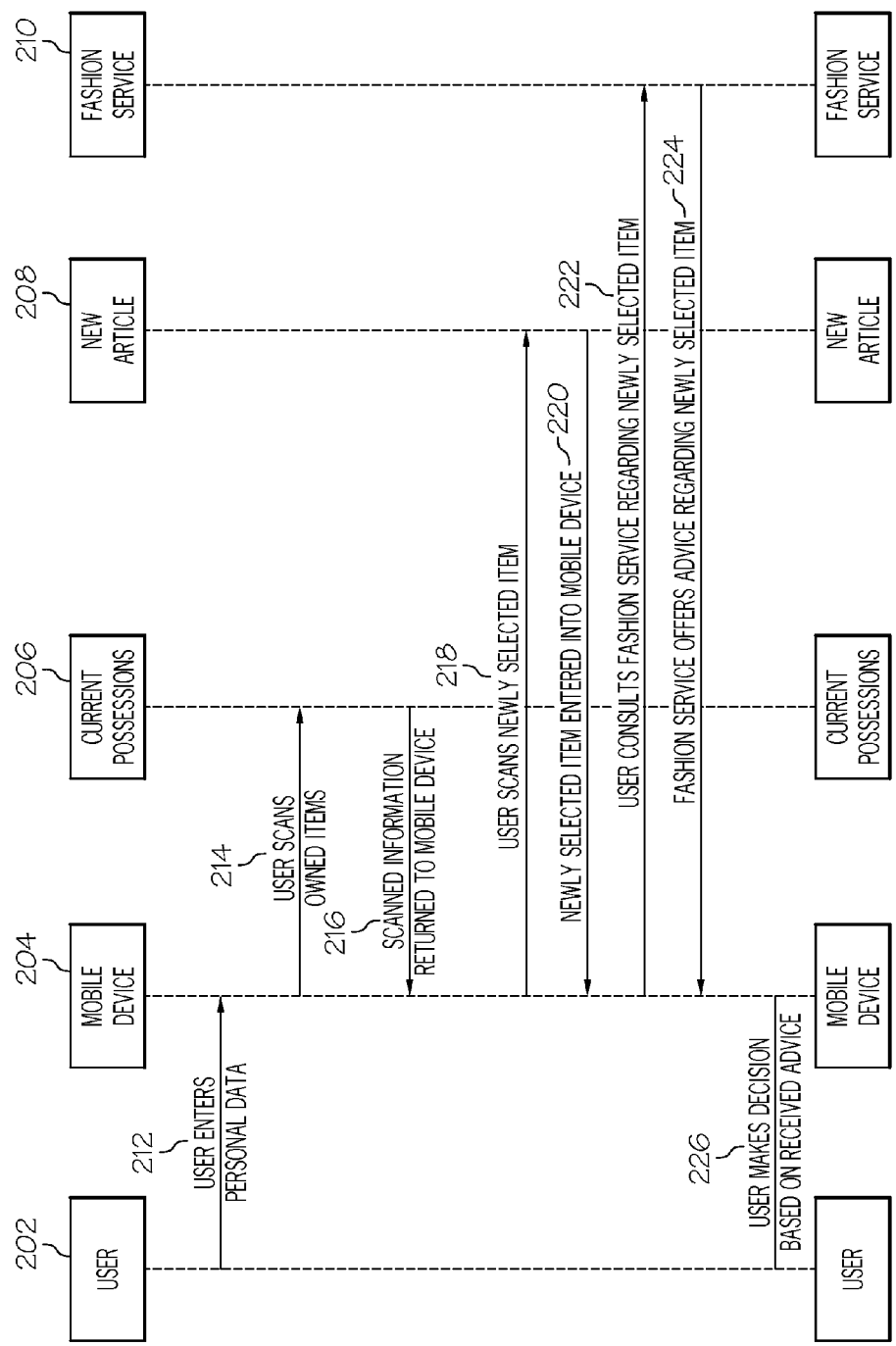
FIG. 2 is a swim-lane flow chart of exemplary steps taken to aid a user in determining if a proposed item meets pre-determined criteria.

Referring now to FIG. 2, a high level swim-lane flowchart of exemplary steps taken in one or more embodiments of the present invention is presented. A user 202 is a user of a computing device, shown for exemplary purposes as a mobile device 204. Mobile device 204 is an example of one of the mobile devices 152 shown in FIG. 1. As such, mobile device 204 is able to receive keyboard, mouse, and other data entry input from user 202. Mobile device 204 is also able to scan information about current possessions 206 and a new article 208. Furthermore, mobile device 204 is able to communicate with fashion service 210, which utilizes a service server such as service server 102 shown in FIG. 1. Note that while mobile device 204 is, as the name indicates, a mobile device such as a PDA, smart phone, micro-laptop, etc., in another embodiment of the present invention mobile device 204 is a stationary computing device, such as a desktop computer. Note also that the mobile device 204 that is used to receive information about the user 202, current possessions 206, new article 208, as well as communicate with fashion service 210 (or a social network) may be a same device or different devices for one or more of these functions.

As indicated in step 212, user 202 can enter user's descriptive data about herself into mobile device 204. This descriptive data comprises her age, height, weight, hair color, skin tone, residential address, work address, occupation, school in which she is enrolled as a student, and other specific objective information. In addition, user 202 is able to enter subjective information into mobile device 204, such as what famous personality she would like to be like, what famous personality she is the most like, what her favorite genre of music is, what her personality type (outgoing, reserved, conservative, outlandish, etc.) is, what her fashion preferences (hip-hop, chic, preppy, etc.) are, etc. This combination of objective and subjective data will be used to aid a service (e.g., fashion service 210) in advising user 202 whether new article 208 should be added to her current possessions 206. In order for mobile device 204 to know what user 202 currently owns, her current possessions 206 are scanned (step 214) and information describing those possessions is stored (step 216) in the mobile device 204. In one embodiment, each of the current possessions is embedded with a radio frequency identifier (RFID) chip (not shown), which can be read (scanned) by a scanner 124 as shown in FIG. 1. Alternatively, scanner 124 can be a barcode or other optical reader. Alternatively, identifiers for the current possessions 206 can be manually entered into the mobile device 204 by the user 202. In any of these embodiments, the identifier provides extensive information about each of the current possessions 206. This information comprises information about what materials are used in constructing the current possessions 206, who the manufacturer is, when they were built, what their country of origin is, what color they are, what geographic region or season they are designed for, etc.

As indicated by steps 218 and 220, the user 202 then uses the mobile device 204 to scan the identifier of a new item 208. This new identifier provides the same types of information described above for the identifiers associated with the current possessions 206.

As the name indicates, the current possessions 206 are items that the user 202 currently owns, has access to, has control over the usage thereof, etc. Such items may be any personal property. For exemplary purposes, however, assume that current possessions 206 are articles of clothing hanging in a closet of the user 202. Now assume that the new item 208 is a new article of clothing that the user is considering purchasing. However, the user 202 is not sure if the new article would match other items (current possessions 206) in her closet. By matching descriptors about the new item 208 with descriptors about the current possessions 206 (e.g., by using a lookup table that matches the new item with the current possessions according to one or more pre-defined criteria), a fashion service 210 can advise the user 202 whether she should or should not purchase the new item 208 (see steps 222, 224, and 226).

Fashion service 210 can take the form of different implementations. For example, in one embodiment, fashion service 210 utilizes a database of metatags set by manufacturers of the articles of clothing. Thus, the manufacturers may utilize a standard metatag code for matching clothing. Thus, if data (identified and located by a unique identifier) for an article of clothing includes a code "A", then any other article of clothing with the code "A" in its data is assumed to match the first article of clothing. The term "matching" is defined to comprise matching clothing for aesthetic purposes (e.g., matching styles, colors, etc.), utility (e.g., all are designed for cold or wet weather), societal standards (e.g., all are designed for working in a professional office), etc.

Figure 3:
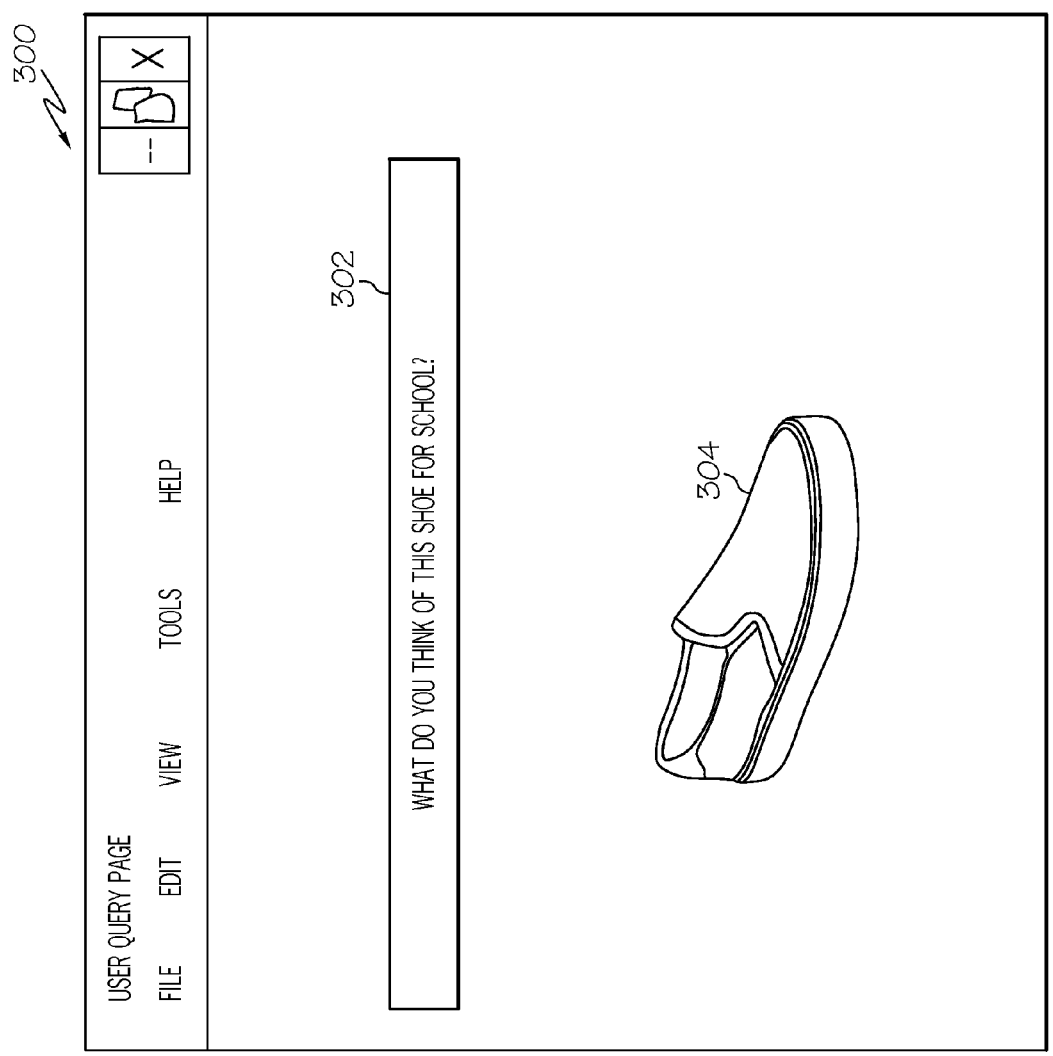
FIG. 3 illustrates an exemplary graphical user interface (GUI) for a user to query a service about the appropriateness of a proposed apparel item according to pre-defined criteria.
Figure 4:
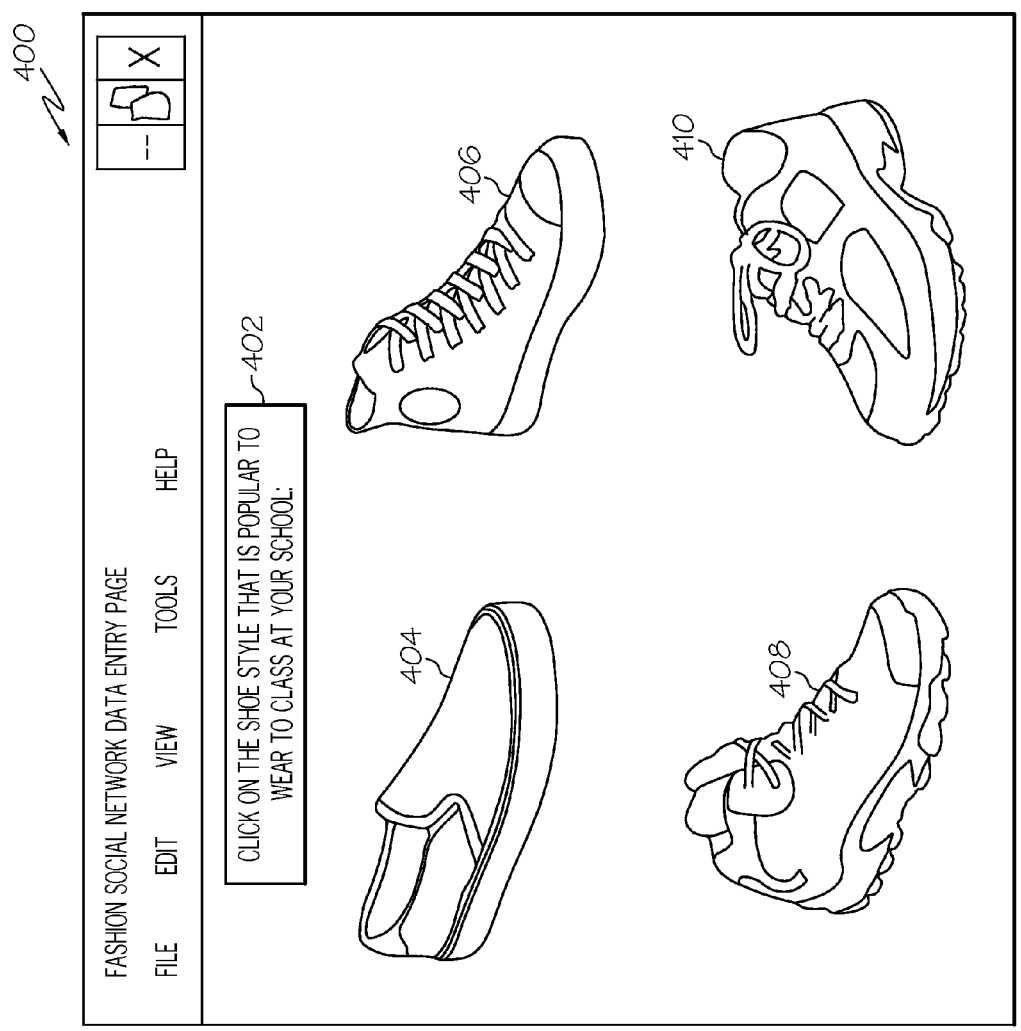
FIG. 4 depicts another GUI used by members of a social fashion network for grading clothing apparel in order to establish the pre-defined criteria.

In another embodiment, fashion service 210 is the product of a fashion social network. For example, assume that this fashion social network is exclusive to high school students in a particular city. A new student may be moving to this city (or even a particular high school), and wants to "fit in" fashion-wise. That new student may log into the fashion social network using a GUI 300, such as shown in FIG. 3, on a member computer such as one of the member computers 154 shown in FIG. 1. She can type in a query into box 302 asking others in the fashion social network if they think that shoe 304 is appropriate for school. In one embodiment, members of the fashion social network can initiate an on-line dialog (e.g., instant messaging). In another embodiment, the answer to her question is based on previous entries from the fashion social network. For example, members of the fashion social network may have been previously queried via their member computers 154 shown in FIG. 1 and, using a GUI such as GUI 400 with query text 402 as shown in FIG. 4, indicate which style of shoe (404, 406, 408, or 410) is appropriate for school. An identifier for a particular illustrated shoe is associated with a set of metatags (found in an addressable/locatable database) for that shoe. These metatags found in the database identify the style (loafer, high-top, hiking, cross-trainer), color, material, brand, etc. of each shoe. For example, assume that shoe 406 has received the most votes from members of the fashion social network as being "in style." Thus, the "consensus opinion" is that high-tops (perhaps in red cotton and made by "XYZ Company") are in style for students at ABC High School in Cleveland, Ohio. A new student can then utilize this information when shopping for her wardrobe when her family relocates to that school city. Returning to FIG. 3, assume that the metatag descriptors associated with shoe 304 and shoe 406 are not a 100% match (for example, assume that the two shoes are of a same material and style, but different colors). If a majority or other pre-set percentage of metatag descriptors match between the two shoes, then the user's query in box 302 will return an answer that recommends purchase of the shoe 304, based on its close similarity to shoe 406.

Note that while the example described assumes that the new student will want to dress like her peers, in another embodiment, this information can be used to dress in a style that is distinctly different from her new peers.

In another embodiment, the fashion social network can be consulted when choosing what to wear to a particular activity/function. That is, in one embodiment new item 208 is actually an article of clothing that the user 202 owns, but is trying to decide if it should be worn with other articles of clothing (current possessions 206). This decision may be based on what others in the fashion social network are wearing, what the current weather conditions (e.g., hot, cold, rainy, etc.) are, what the nature of the activity is (e.g., prom versus picnic), etc. All such information can be entered into the fashion service 210 by members of the fashion social network.

Note that the decision to buy/wear a particular article of clothing can be based not only on the consensus opinion created by the fashion social network, but can also be based on the attributes of the querying user, either alone or in conjunction with the consensus opinion. In one embodiment, the consensus opinion and user attributes are coded and scaled for entry into an algorithm used by software (e.g., ASRL 148 shown in FIG. 1) to provide a rated opinion (e.g., on a scale from "Strongly Recommend" to "Strongly Advise Against") as to whether that article of clothing should be worn by the user.

The example described above for a high school student may be considered by some to be trivial. However, there are circumstances in which clothing choices are indisputably critical. For example, when negotiating with persons from another country, another culture, etc., an improper choice of clothing may be catastrophically offensive.

While the present invention has utilized clothing as an example of article selection, it is to be understood that, in other embodiments, other types of articles being considered for selection may be those of any personal property. For example, assume that a user 202 is embarking on a woodworking project. He has scanned into his mobile device 204 identification information about his tools and/or supplies (e.g., stains, fasteners, lumber, etc.), as well as a project that he is embarking on (e.g., building an armoire). By querying a service (analogous to fashion service 210) for woodworkers, user 202 can quickly determine what other tools he needs. These needs can be further refined by data that he has entered about himself, such as his skill level with hand chisels, power tools, high-speed cable tools, etc. Thus, as stated above, in one embodiment of the present invention the "current possessions" may be any personal property of the user, and the "fashion service" can be any advisory service that uses a database or network of information/resources for availability to the user 202 via a computing device such as mobile device 204. In one embodiment, the fashion service 210 is a social network that provides a consensus opinion, utilizing the methodology described herein, on whether particular items (e.g., jewelry, music recordings, videos, movies, cars, etc.) are currently in vogue.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer-implemented method of retrieving shared subjective opinions, the computer-implemented method comprising:
   a first computing device scanning current descriptive information about current possessions of a user;
   receiving, from a second computing device, new descriptive information about a new item, wherein the new descriptive information is derived by the second computing device scanning the new item;
   consulting with a service to determine if the new item matches a pre-defined criterion that has been set for the new item, wherein the service is a social network, and wherein the social network provides a group consensus that determines whether the new item matches the pre-defined criterion, and wherein the pre-defined criterion is based on a user's descriptive data for the user and the current descriptive information about the current possessions of the user;
   presenting a recommendation to the user based on whether the new item matches the pre-defined criterion, wherein the new item is a physical tool needed for a craft project; and
   the first computing device querying the service to determine what additional tools, beyond those presently owned by the user, are needed for the user to complete the craft project, wherein the service is dedicated to advice related to the craft project.

2. The computer-implemented method of claim 1, wherein the user's descriptive data describes physical attributes of the user.

3. The computer-implemented method of claim 1, wherein the new descriptive information describes a design of the new item and material used to construct the new item.

4. The computer-implemented method of claim 1, further comprising:
   the first computing device selecting said additional tools according to a skill level of said user with said additional tools.

5. The computer-implemented method of claim 1, wherein the user's descriptive data describe a famous personality that the user desires to emulate.

6. The computer-implemented method of claim 1, wherein the first and second computing devices are a same device.

7. A computer-implemented social network, wherein the computer-implemented social network comprises:
   a server;
   a database that is accessible to the server; and
   a graphical user interface (GUI) generator, wherein the GUI generator transmits a GUI, via a computer network, to a member of a social network, wherein the social network provides a group consensus as to whether a new item matches a pre-defined criterion that has been set for the new item, wherein the pre-defined criterion is based on a user's descriptive data for the user and current descriptive information about current possessions of the user, and wherein the GUI is configured to:
      receive member-provided input regarding information about the current possessions of a user;
      receive new descriptive information about the new item;
      provide a portal for consulting with the social network to determine if the new item matches the pre-defined criterion that has been set for the new item;
      and wherein the new item is a physical tool needed for a craft project, and wherein the computer-implemented social network is further configured to determine what additional tools, beyond those presently owned by the user, are needed for the user to complete the craft project, wherein the computer-implemented social network is dedicated to advice relation to the craft project; and wherein the server is configured to share the member-provided input stored in the database with users of the social network.

8. The computer-implemented social network of claim 7, wherein the member-provided input is provided by a member rating service-provided depictions of personal articles, and wherein the service-provided depictions of personal articles are associated with metatags that describe the personal articles.

9. The computer-implemented social network of claim 7, wherein the member-provided input is limited to input from members from a pre-determined occupation group.

10. The computer-implemented social network of claim 7, wherein the member-provided input is limited to input from members of a pre-determined geographic area.

11. A computer program product for retrieving shared subjective opinions, said computer program product comprising:
   a non-transitory computer readable storage medium having stored and encoded thereon;
   first program instructions executable by a processor to receive a user's descriptive data, wherein the user's descriptive data describes descriptive attributes of a user;
   second program instructions executable by a processor to scan current descriptive information about current possessions of the user;
   third program instructions executable by a processor to scan new descriptive information about a new item;
   fourth program instructions executable by a processor to contact a service to determine if the new item matches a pre-defined criterion that has been established for the new item, wherein the service is a social network, and wherein the social network provides a group consensus as to whether the new item matches the pre-defined criterion wherein the pre-defined criterion is based on the descriptive attributes of the user and the current descriptive information about the current possessions of the user; and
   fifth program instructions executable by a processor to present a recommendation to the user to select or reject the new item, wherein the recommendation is based on whether the new item matches the pre-defined criterion, wherein the new item is a physical tool needed for a craft project; and
   sixth program instructions executable by a processor to cause the service to determine what additional tools, beyond those presently owned by the users, are needed for the user to complete the craft project, wherein the service is dedicated to advice related to the craft project.

12. The computer program product of claim 11, wherein the new descriptive information describes a design of the new item and material used to construct the new item.

13. The computer program product of claim 11, further comprising:
   seventh program instructions executable by a processor to select said additional tools according to a skill level of said user with said additional tools.

14. The computer program product of claim 13, wherein the new descriptive information about the new item is stored in a radio frequency identifier (RFID) chip.

15. A computer system comprising:
   a central processing unit (CPU), a computer readable memory, and a non-transitory computer readable storage medium;
   first program instructions to receive a user's descriptive data, wherein the user's descriptive data describes descriptive attributes of a user;
   second program instructions to scan current descriptive information about current possessions of the user;
   third program instructions to scan new descriptive information about a new item;
   fourth program instructions to contact a service to determine if the new item matches a pre-defined criterion that has been established for the new item, wherein the service is a social network, and wherein the social network provides a group consensus as to whether the new item matches the pre-defined criterion wherein the pre-defined criterion is based on the descriptive attributes of the user and the current descriptive information about the current possessions of the user;
   fifth program instructions to present a recommendation to the user to select or reject the new item, wherein the recommendation is based on whether the new item matches the pre-defined criterion, wherein the new item is a physical tool needed for a craft project; and
   sixth program instructions executable by a processor to cause the service to determine what additional tools, beyond those presently owned by the user, are needed for the user to complete the craft project, wherein the service is dedicated to advice related to the craft project; and wherein
   said first, second, third, fourth, fifth, and sixth program instructions are stored on said non-transitory computer readable storage medium for execution by said CPU via said computer readable memory.

16. The computer system of claim 15, wherein the user's descriptive data describe a famous personality that the user desires to emulate.

* * * * *